(12) United States Patent
Mackert

(10) Patent No.: US 11,751,690 B2
(45) Date of Patent: Sep. 12, 2023

(54) SEATING FURNITURE CHASSIS

(71) Applicant: Innotec Motion GmbH, Lippstadt (DE)

(72) Inventor: Michael Mackert, Rüthen (DE)

(73) Assignee: INNOTEC MOTION GMBH, Lippstadt (DE)

( * ) Notice: Subject to any disclaimer, the term of this patent is extended or adjusted under 35 U.S.C. 154(b) by 97 days.

(21) Appl. No.: 17/371,910

(22) Filed: Jul. 9, 2021

(65) Prior Publication Data

US 2021/0330086 A1 Oct. 28, 2021

Related U.S. Application Data

(63) Continuation of application No. PCT/EP2020/050512, filed on Jan. 10, 2020.

(30) Foreign Application Priority Data

Jan. 10, 2019 (DE) .......................... 202019100107.0

(51) Int. Cl.
*A47C 7/42* (2006.01)
*B60N 2/68* (2006.01)
*F16B 12/38* (2006.01)

(52) U.S. Cl.
CPC ................ *A47C 7/42* (2013.01); *F16B 12/38* (2013.01); *B60N 2002/684* (2013.01)

(58) Field of Classification Search
CPC ............................ A47C 7/42; B60N 2002/684
See application file for complete search history.

(56) References Cited

U.S. PATENT DOCUMENTS

| | | | | |
|---|---|---|---|---|
| 5,269,589 A | * | 12/1993 | Brothers | A47C 7/42 297/440.16 |
| 2002/0145324 A1 | * | 10/2002 | Metzler | B60N 2/20 297/378.1 |
| 2011/0215630 A1 | | 9/2011 | Grove | |
| 2019/0219083 A1 | * | 7/2019 | Selle | F16B 12/20 |

FOREIGN PATENT DOCUMENTS

| | | | | |
|---|---|---|---|---|
| DE | 10105364 A1 | * | 8/2002 | ............... B60N 2/20 |
| DE | 102014002215 A1 | | 8/2015 | |
| EP | 2792276 A1 | | 10/2014 | |
| ES | 2393394 A1 | * | 12/2012 | ............... B60N 2/20 |
| FR | 2762368 A1 | * | 10/1998 | ........... B60N 2/3013 |
| FR | 2803562 A1 | * | 7/2001 | ............. B60N 2/366 |

OTHER PUBLICATIONS

Search Report in corresponding International Patent Application No. PCT/EP2020/050512, dated Feb. 4, 2020.

* cited by examiner

*Primary Examiner* — Timothy J Brindley
(74) *Attorney, Agent, or Firm* — Edell, Shapiro & Finnan, LLC

(57) ABSTRACT

A seating furniture chassis comprises a base body, a fastener arranged on the base body and comprising a fastening element and a spring element that exerts a spring force on the fastening element, and a back part releasably fastenable to the fastener, wherein the fastening element is moved by the back part counter to the spring force upon fastening of the back part to the fastener.

18 Claims, 8 Drawing Sheets

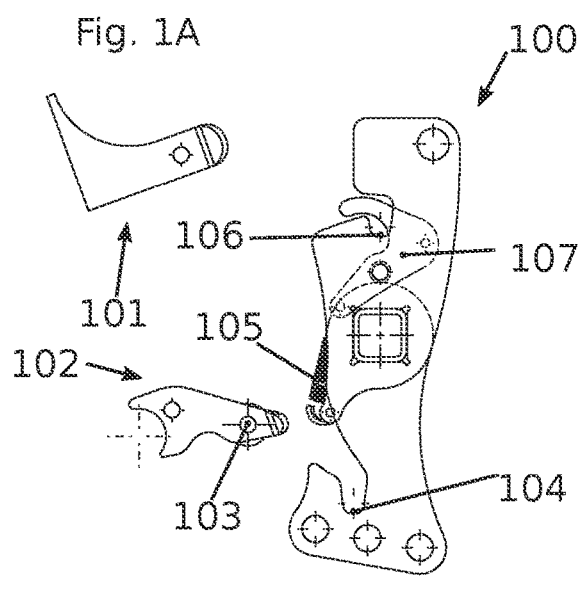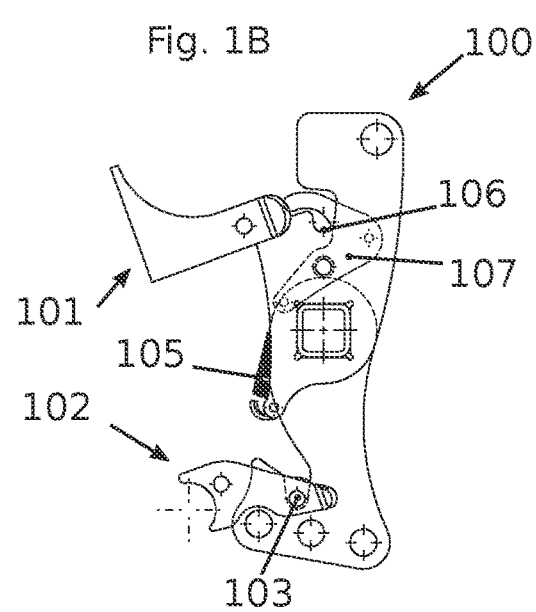

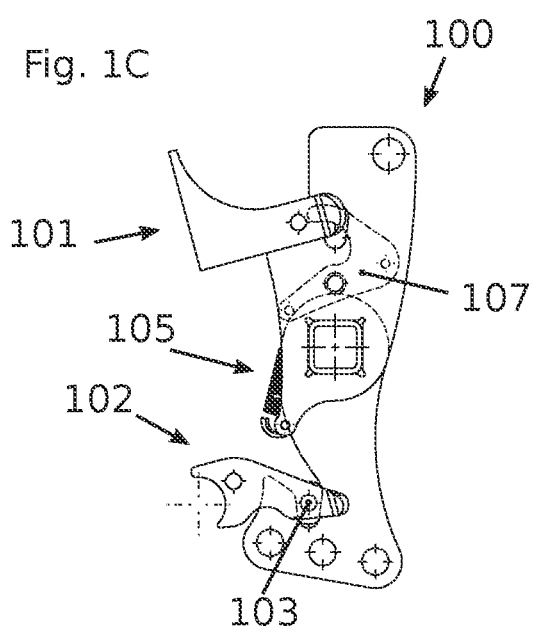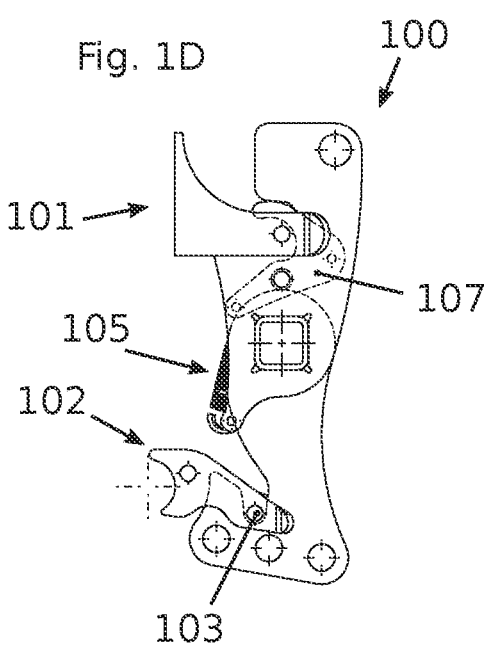

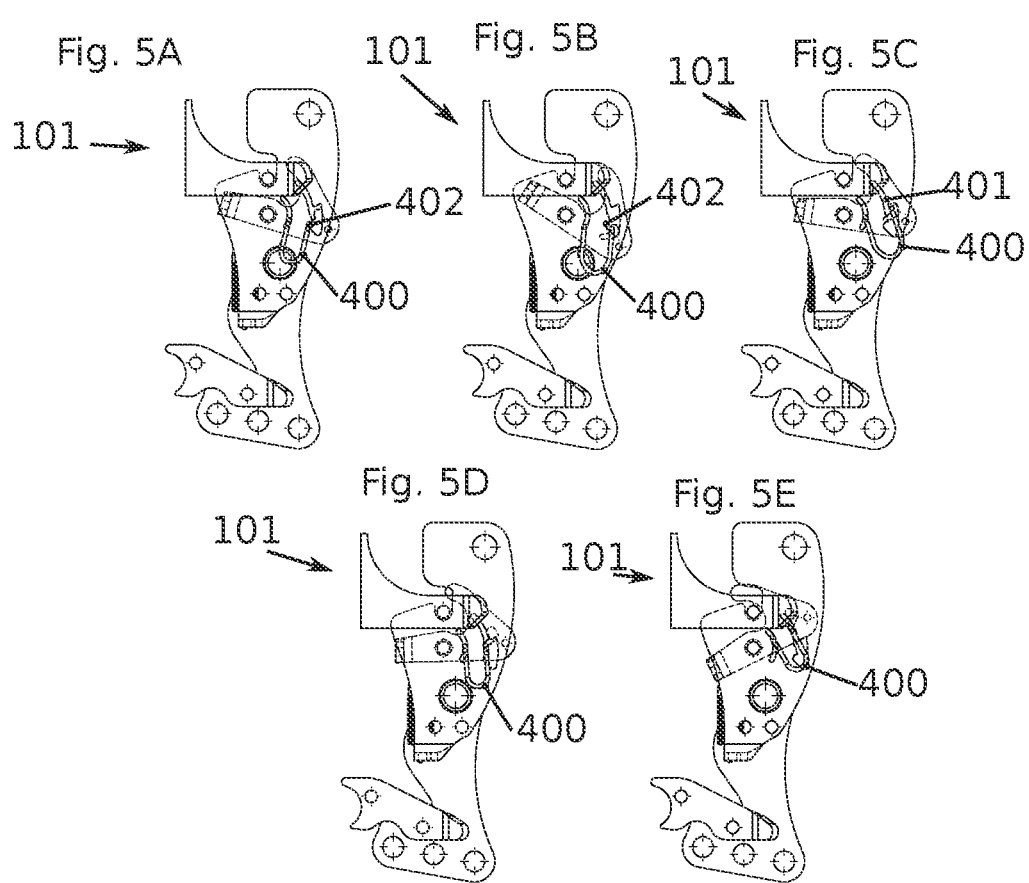

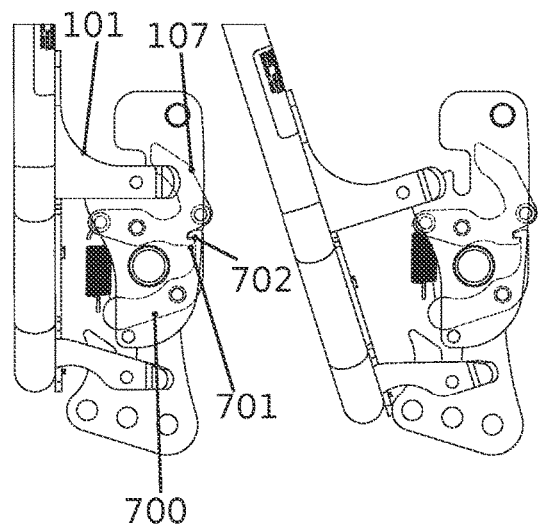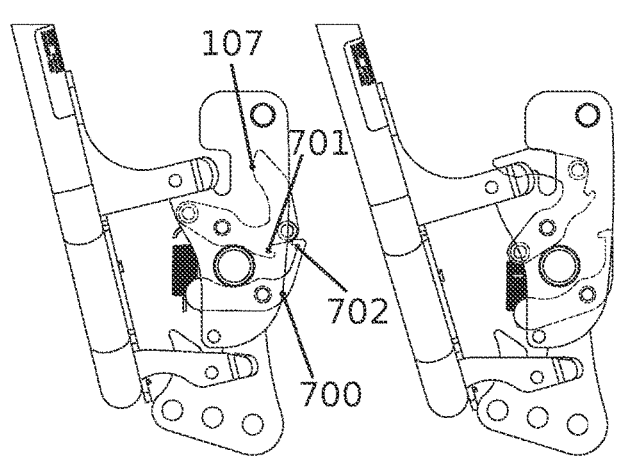
Fig. 7A  Fig. 7B  Fig. 7C  Fig. 7D

SEATING FURNITURE CHASSIS

This application is a continuation of International Application No. PCT/EP2020/050512, filed on Jan. 10, 2020, which claims priority under 35 U.S.C. § 119 to Application No. DE 202019100107.0 filed on Jan. 10, 2019, the entire contents of which are hereby incorporated by reference.

TECHNICAL FIELD

The present disclosure relates to a seating furniture chassis.

BACKGROUND

Seating furniture chassis having a back part that is fastenable to fastener of a base body are known from the prior art. By contrast, the underlying problem addressed by the present disclosure is to create a seating furniture chassis having a back part that can be fastened thereto in a particularly simple manner. In addition, a modular system having such a seating furniture chassis and a plurality of back parts and a method for fastening a back part of such a seating furniture chassis to a base body of such a seating furniture chassis are to be created.

SUMMARY

The seating furniture chassis comprises a base body, a fastener, and a back part. In the context of this specification, a base body is understood to mean, in particular, a construct that comprises a seat frame and one or more feet with which the seating furniture chassis is erectable on a floor surface. The seat frame can frame a seat. A user can sit on the upholstery after upholstering the seat surface.

The fastener is arranged on the base body. For example, it can be arranged in a rear edge area of the base body. This can be, in particular, an edge area that, when the seating furniture chassis is used as intended, is arranged behind a user sitting on the upholstered seat frame.

The back part is releasably fastenable to the fastener. In the context of this specification, a releasable fastening is understood to mean, in particular, that the back part can be fastened to the fastener intuitively and in a tool-free manner and can also be released from the fastener in a tool-free manner. It must be ensured that neither the back part nor the fastener is damaged during the fastening or the release of the fastening.

In the context of this specification, a back part is understood to mean, in particular, a part that supports a back of a user when the seating furniture chassis is used as intended.

The fastener comprises a spring element and a fastening element. The spring element exerts a force on the fastening element. Upon fastening of the back part to the fastener, the fastening element is moved by the back part counter to the spring force. In the context of this specification, fastening is understood to mean, in particular, the process of fastening the back part to the base body. In this manner, the back part can be fastened to the fastener by utilizing the spring force and can be released again by overcoming the spring force.

The removable back part has the particular advantage that the base body can be transported separately from the back part. Therefore, two individual, detached, and less cumbersome objects can be transported instead of a single, large, and cumbersome object. It is also advantageous for the user to be able to fasten the back part to the fastener at home, because the user can thus select a back part that is suitable for him or her and is not restricted to a specific back part that is already fastened to the base body. An exchange of the back part is also simplified. This is particularly advantageous when a user wishes to use a larger or smaller back part, for example.

In addition, the handling of the seating furniture chassis during production is simplified. Due to health and safety regulations, it may not be permissible in light of the weight for a single worker to carry both the base body and the back part at the same time. Because the back part and the base body can each be carried individually, a single worker can thus transport the entire seating furniture chassis in a tool-free manner.

According to a disclosed embodiment, the fastening element can be pivotable about a first pivot axis. The movement counter to the spring force can be a first pivoting movement about the first pivot axis. In the context of this specification, a pivot axis is understood to mean, in particular, a geometric axis. An axle does not necessarily have to be present as a component.

According to a disclosed embodiment, the fastener can have a latching area. The back part can comprise a latching element. The latching element can be arranged in the latching area in the fastened state of the back part on the fastener.

According to a disclosed embodiment, the fastening element, triggered by the spring force, can exert a latching force on the latching element when the latching element is arranged in the latching area. For example, the spring element can be fastened in a first end area on the fastening element, whereby a second end area of the fastening element, which is arranged opposite the first end area, can exert the latching force on the latching element. In this case, due to the spring force, a torque acts on the fastening element, which in turn causes the latching force.

In addition to the latching force triggered by the spring force, it is possible for the fastening element to exert a force on the latching element, said force holding the latching element in the latching area.

According to a disclosed embodiment, the fastening element can be arranged in a first position when the latching element is arranged in the latching area.

According to a disclosed embodiment, the spring force can trigger a pivoting movement of the fastening element about the first pivot axis from the first position into a second position when the latching element is removed from the latching area.

According to a disclosed embodiment, the latching element can be configured to trigger the movement of the fastening element counter to the spring force. For example, upon fastening of the back part to the fastener, the latching element can come into contact with the fastening element and thus trigger the movement.

According to a disclosed embodiment, an outer shape of the latching element can be adapted to the latching area. The latching area can have, for example, a rounding, the radius of which corresponds approximately to a radius of a rounding of the latching element. The latching element can thus be received particularly well in the latching area.

According to a disclosed embodiment, the latching element can be insertable into the latching area from above. In particular, it is possible for the latching element to be inserted into the latching area from above upon fastening of the back part to the fastener.

According to a disclosed embodiment, the back part can be fastenable to the fastener via a second pivoting movement of the back part. In particular, it is possible that, upon this second pivoting movement, the movement of the fastening element counter to the spring force is triggered by the latching element.

According to a disclosed embodiment, the back part can comprise a positioning element. The fastener can comprise a positioning area. The positioning element can be insertable into the positioning area. The positioning element can define a second pivot axis. The second pivoting movement can occur about the second pivot axis. The interaction of the positioning element with the positioning area is particularly advantageous for a particularly simple fastening of the back part to the fastener.

According to a disclosed embodiment, an outer shape of the positioning element can be adapted to a shape of the positioning area. The positioning area can have, for example, a rounding, the radius of which corresponds approximately to a radius of a rounding of the positioning element. The positioning element can thus be received particularly well in the positioning area.

According to a disclosed embodiment, the positioning element can be insertable into the positioning area from above.

According to a disclosed embodiment, the back part can comprise a backrest. In this context, a backrest is understood to be an area that, after the application of upholstery by a user, can be used in order to rest their back when the seating furniture chassis is used as intended.

According to a disclosed embodiment, the fastener can comprise a guiding mechanism and a latching mechanism. The fastening element can comprise a spring mechanism. The spring mechanism can be guided in the guiding mechanism upon movement of the fastening element. The spring mechanism can be latchable in the latching mechanism. In the latched state of the spring mechanism, the fastening element can release the latching element. In the context of this specification, this is understood to mean, in particular, that the fastening element does not exert any force on the latching element and the latching element can be removed from the fastener.

This embodiment is advantageous, because the disassembly of the back part is simplified. A user can secure the fastening element by latching the spring mechanism in the latching mechanism. The back part can then be removed conveniently.

According to a disclosed embodiment, the spring mechanism can be elastically deformable. In particular, it can be removable from the latching mechanism by way of elastic deformation. The spring mechanism can thus be separated from the latching mechanism in a particularly simple manner. The fastening element can then be used again as described above.

According to a disclosed embodiment, the fastening element can have a first protrusion, which is engageable with a second protrusion of a pivotable holding element. The second protrusion can hold the first protrusion due to gravity when the first protrusion is engaged with the second protrusion, so that the fastening element remains in a position in which it releases the latching element.

This embodiment is particularly advantageous for an easy disassembly of the backrest. A user can disassemble the backrest calmly and without major obstacles when the fastening element releases the latching element.

The modular system comprises a seating furniture chassis and a plurality of back parts. The back parts have different sizes. All back parts are fastenable to the fastener in the same manner.

In the context of this specification, a modular system is understood to mean, in particular, a system in which different back parts are fastenable to the fastener without adaptations of the back parts and the fastener.

The modular system is particularly advantageous when, for example, a user wishes to exchange their back part. They merely need a new back part and can carry out the exchange by themselves.

In the method, the positioning element is inserted into the positioning area. Then, the second pivoting movement is carried out. During the second pivoting movement, the latching element pivots the fastening element about the first pivot axis. Due to the second pivoting movement, the latching element is also inserted into the latching area, preferably from above. The fastening element then exerts the latching force on the latching element.

BRIEF DESCRIPTION OF THE DRAWINGS

Further features and advantages of the disclosed seating furniture chassis will become apparent from the following description of preferred exemplary embodiments with reference to the attached drawings. The same reference numerals are used for the same or similar components as well as for components having the same or similar functions. The figures show:

FIGS. 1A-1D are four lateral views of a fastener according to an embodiment and parts of a back part;

FIGS. 5A-5E are multiple schematic lateral views of the embodiment shown in FIG. 4;

FIGS. 7A-7D are multiple schematic lateral views of a disassembly of the seating furniture chassis shown in FIGS. 6A-6C.

DETAILED DESCRIPTION

Figure 2:
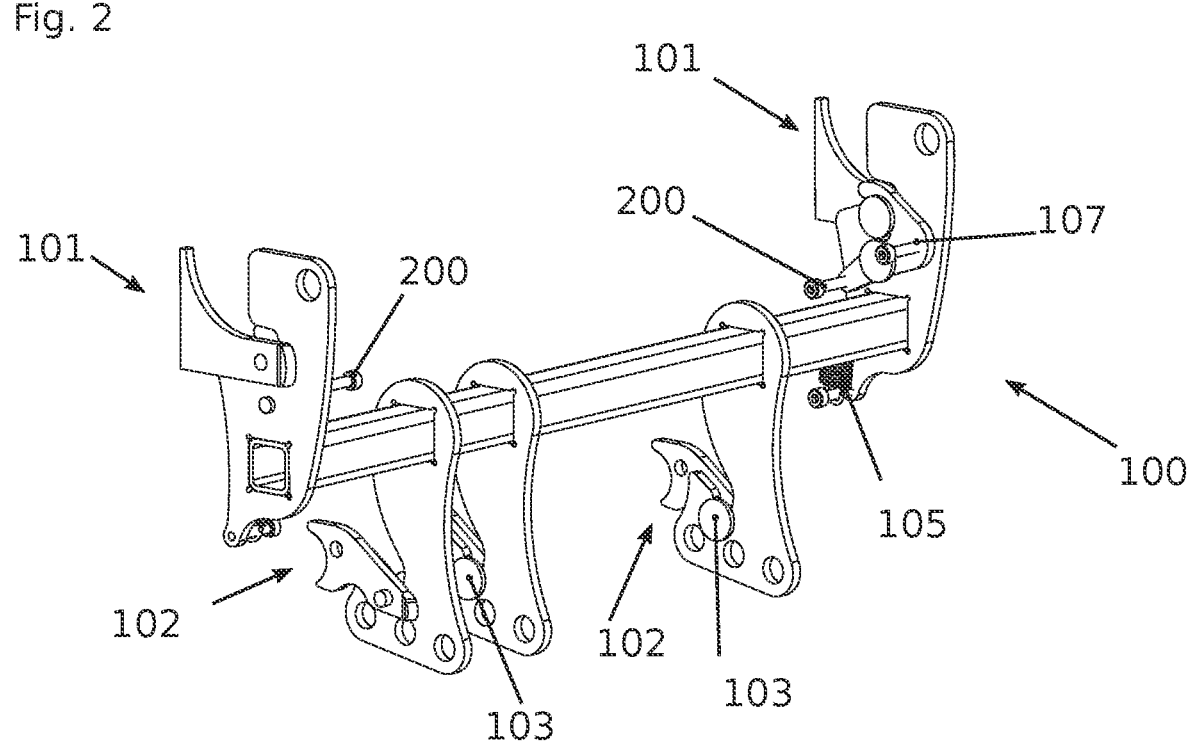
FIG. 2 is a schematic perspective view of the fastener shown in FIGS. 1A-1D.

The fastener 100 is arranged on a base body of a seating furniture chassis, not shown in FIGS. 1A to 1D. A back part can be fastened to the fastener. For this purpose, the back part has a latching element 101 and a positioning element 102. The positioning element 102 in turn comprises a bolt 103. The fastener comprises a positioning area 104, a spring element 105, a latching area 106, and a fastening element 107.

The first spring element 105 is connected to the fastening element 107 and exerts a spring force on the first fastening element 107. The fastening element 107 is pivotable about a first pivot axis.

In FIGS. 1A to 1D, the fastening process of the back part to the fastener 100 is shown in chronological order. At first—as shown in FIG. 1A—the back part and the fastener 100 are separate from one another. Using the positioning element 102, a connection is then established between the fastener 100 and the back part. The bolt 103 is inserted into the positioning area 104. For this purpose, it is advantageous for the outer shape of the bolt 103 to be adapted to the shape of the positioning area 104. In addition, the bolt 103 and the positioning area 104 can have the same color, so that assembly is simplified for a user, because the same color indicates to them that these two components must be connected to one another. Alternatively or additionally, a tactile shape marking can be provided on the bolt 103 and on the positioning area 104. The shape markings can be designed similarly or identically and can support blind users in the assembly. The bolt 103 thus defines a second pivot axis, about which the back part is pivotable. This state is shown in FIG. 1B.

In order to simplify the insertion of the bolt 103 into the positioning area 104, the positioning element 102 has a slope over which the positioning element 102 can glide, so that the bolt 103 is inserted into the positioning area 104.

The back part is then pivoted about the second pivot axis. In so doing, the latching element 101 comes into contact with the fastening element 107 and pivots about the pivot axis counter to the spring force. Here, it is advantageous for the latching element 101 to have a slope on the side facing the fastening element 107 during the fastening process, so that an insertion is simplified. This state is shown in FIG. 1C.

When the pivoting movement of the back part about the second pivot axis is continued, the latching element 101 arrives in the latching area 106. For this purpose, it is advantageous for the outer shape of a section of the latching element 101 to be adapted to the shape of the latching area 106. In this position, the fastening element 107 exerts a latching force on the latching element 101, said force being caused by the spring element 105. In this manner, the latching element 101 is securely held in the latching area 106. This state is shown in FIG. 1D.

The fastening element 107 has a hook-shaped protrusion, which encompasses a part of the latching element 101 when the latching element 101 is arranged in the latching area 106. The hook-shaped protrusion has a curvature. In the area of the curvature, the fastening element 107 is in contact with the latching element 101 when the latching element 101 is arranged in the latching area 106. It is possible for the curvature to have an inconstant curvature radius. In the vicinity of one end of the fastening element 107, the curvature radius can be smaller than in an area that is further away from the end.

The inconsistent curvature radius has the particular advantage that, upon insertion of the latching element 101 into the latching area 106, the fastening element 107 pulls the latching element 101 into the latching area and clamps it in the inserted state. The latching element 101 is thus held in the latching area 106 without play.

The latching element 101 can be matched in color to the latching area 106. For example, the latching element 101 can have the same color as the latching area 106. This further simplifies the assembly for a user.

Additionally or alternatively, matching shape markings can be provided on the latching area 106 and on the latching element 101. For example, the same shape marking can be arranged on the latching area 106 as on the latching element 101. In the context of this specification, a shape marking is understood to mean a marking that is tactile. It can be designed, for example, as an elevation or depression. The shape marking can assist blind users in the assembly.

It is also possible for the latching element 101 and/or the latching area 106 to comprise a magnetic element, so that the latching element 101 and the latching area 106 are held together by a magnetic force. This is particularly advantageous during assembly, because the user notices the correct process for insertion due to the magnetic force. The insertion process can be, for example, guided by the magnetic force.

FIG. 2 shows the fastener 100, wherein the back part is fastened to the fastener 100. This state therefore corresponds to the state shown in FIG. 1D. FIG. 2 further shows that the fastener 100 comprises two fastening elements 107. The back part comprises a plurality of positioning elements 102. The fastener 100 comprises a corresponding number of positioning areas. FIG. 2 also shows two spring fastener 200, to each of which one of the spring elements 105 is fastened in order to exert the spring force on the respective fastening element 107.

Figure 3:
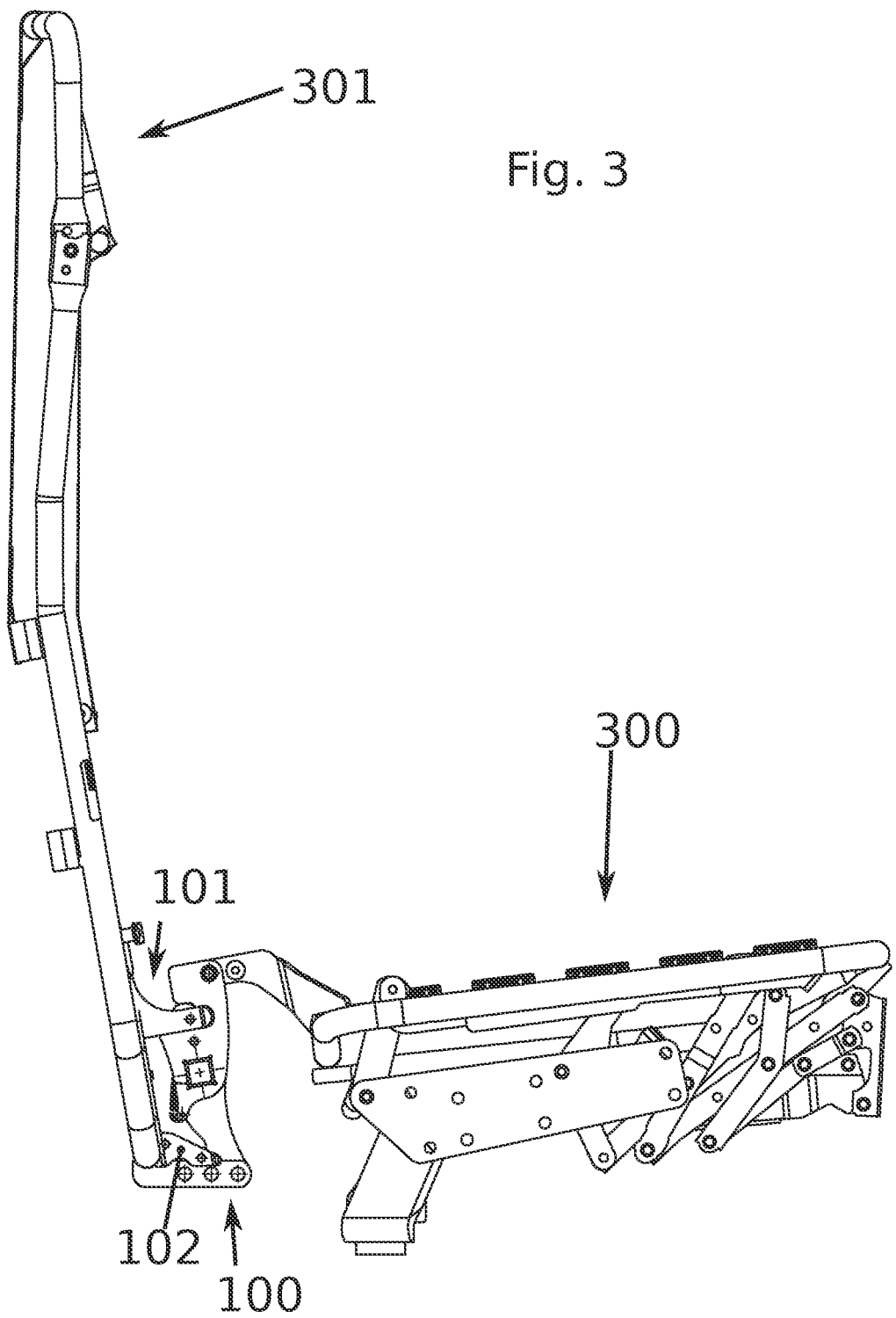
FIG. 3 is a schematic lateral view of a seating furniture chassis according to a disclosed embodiment with a base body and a back part fastened to the base body.

The seating furniture chassis shown in FIG. 3 comprises a base body 300 with a seat frame, the fastener 100 arranged on the base body 300, and a back part 301 fastened to the fastener 100. The back part 301 comprises the positioning element 102 and the latching element 101. The back part 301 is fastened to the fastener 100 with the latching element 101 and the positioning element 102.

Figure 4:
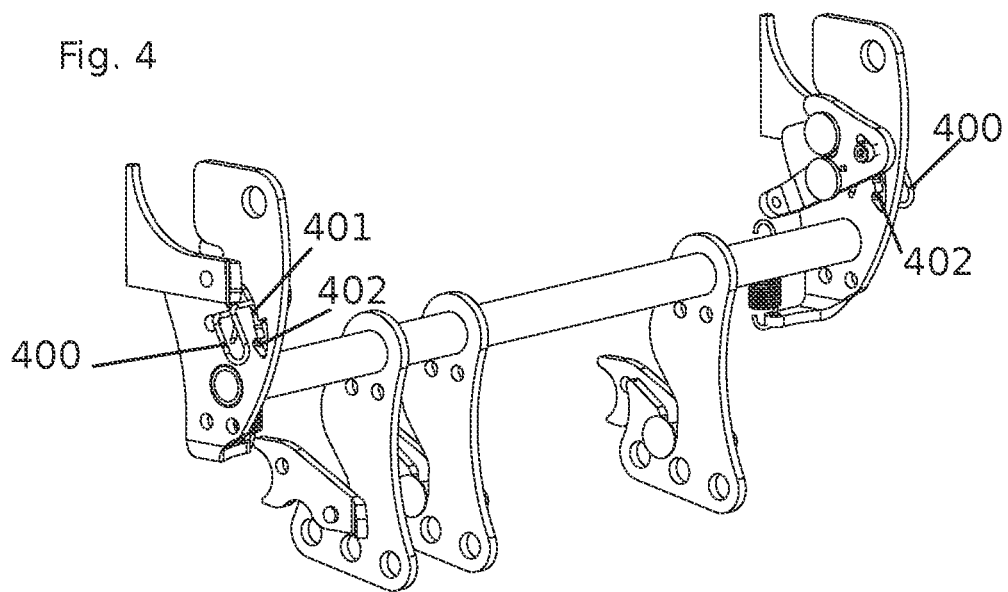
FIG. 4 is a schematic perspective view of fastener according to a disclosed embodiment.

The embodiment shown in FIG. 4 differs from the embodiment in FIG. 2 in particular in that the fastening element 107 comprises a spring mechanism 400, which is guided in a guiding mechanism 401 and is latchable into a latching mechanism 402.

The function of the embodiment from FIG. 4 can be understood using FIGS. 5A to 5E. When the latching element 101 is to be released from the fastener 100, the fastening element 107 is pivoted such that the latching element 101 is released. In this state, the latching element 101 no longer exerts any force on the fastening element 107. During the pivoting of the fastening element 107, the spring mechanism 400 is guided in the guiding mechanism 401 and latches into the latching mechanism 402 such that the fastening element 107 is no longer automatically moved back. This state is shown in FIG. 5A.

The back part can now be removed. Subsequently, the spring mechanism 400 can be elastically deformed such that it is moved out of the latching mechanism 402 (FIG. 5B). It is pivoted back by the spring force of the spring element 105 (FIG. 5C) and arrives at a stop. The spring mechanism 400 can then be deformed back again such that it arrives in the guiding mechanism 401. The fastening element 107 is then pivoted back further so that it is again suitable for fastening of the latching element 101.

The embodiment in FIGS. 6A-6C and 7 differs in particular from the embodiment in FIGS. 4 and 5 in how the fastening element 107 is held during disassembly so that the back part can be removed.

Figure 6A:
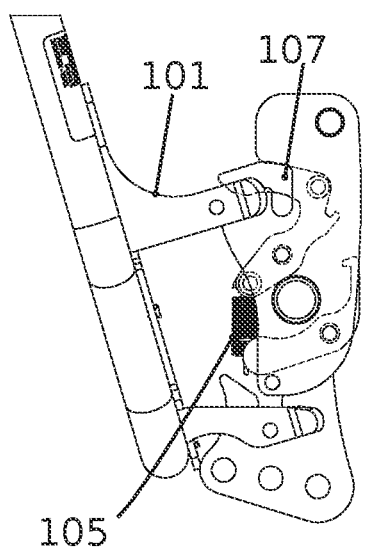
FIGS. 6A-6C are multiple schematic lateral views of an assembly of a seating furniture chassis according to a further disclosed embodiment.
Figure 6B:
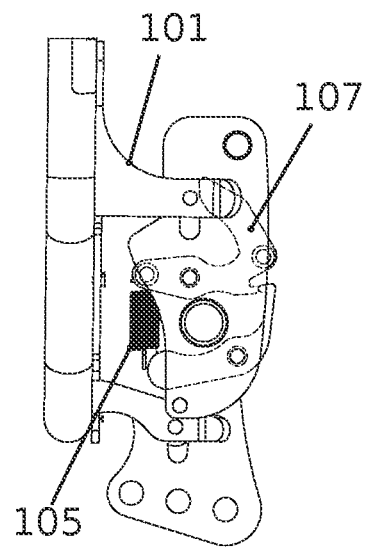
Figure 6C:
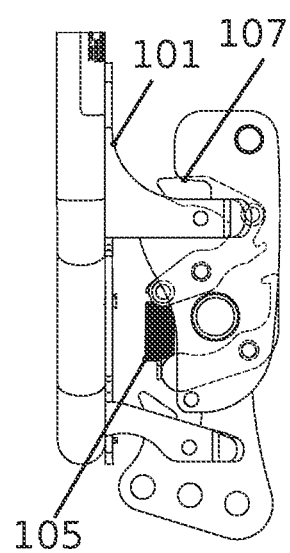

The assembly is shown in FIGS. 6A to 6C. First, the fastening element 107 is pivoted by the latching element 101. For the disassembly, which is shown in FIGS. 7A to 7D, a protrusion 701 of the fastening element 107 is brought into engagement with a protrusion 702 of a pivotable holding element 700. The protrusion 702 of the pivotable holding element 700 then holds the protrusion 701 of the fastening element 107 due to gravity, such that the fastening element remains in a position in which it releases the latching element 101.

After removal of the latching element 101 from the latching area, the two protrusions 701 and 702 can be released from one another by pivoting both the fastening element and the holding element 700. FIG. 7D again shows the starting position for the assembly, as is also shown in FIG. 6A.

What is claimed is:
1. A seating furniture chassis comprising:
a base body;

a fastener arranged on the base body and comprising a fastening element, a spring element that exerts a spring force on the fastening element, and a positioning area; and a back part comprising a positioning element that is insertable into the positioning area and that defines a back part pivot axis, wherein the back part is releasably fastenable to the fastener via a pivoting movement of the back part that occurs about the back part pivot axis, wherein the fastening element is moved by the back part counter to the spring force upon fastening of the back part to the fastener.

2. The seating furniture chassis of claim 1, wherein the fastening element is pivotable about a fastening element pivot axis, and wherein the movement counter to the spring force is a pivoting movement about the fastening element pivot axis.

3. The seating furniture chassis of claim 2, wherein the fastener has a latching area and the back part comprises a latching element, and wherein the latching element is arranged in the latching area in a fastened state of the back part on the fastener.

4. The seating furniture chassis of claim 3, wherein the fastening element, triggered by the spring force, exerts a latching force on the latching element when the latching element is arranged in the latching area.

5. The seating furniture chassis of claim 3, wherein the fastening element is arranged in a first position when the latching element is arranged in the latching area.

6. The seating furniture chassis of claim 5, wherein the spring force triggers a pivoting movement of the fastening element about the fastening element pivot axis from the first position into a second position when the latching element is removed from the latching area.

7. The seating furniture chassis of claim 3, wherein the latching element is configured to trigger the movement of the fastening element counter to the spring force.

8. The seating furniture chassis of claim 3, wherein an outer shape of the latching element is adapted to the latching area.

9. The seating furniture chassis of claim 3, wherein the latching element is insertable into the latching area from above.

10. The seating furniture chassis of claim 1, wherein an outer shape of the positioning element is adapted to a shape of the positioning area.

11. The seating furniture chassis of claim 1, wherein the positioning element is insertable into the positioning area from above.

12. The seating furniture chassis of claim 1, wherein the back part comprises a backrest.

13. The seating furniture chassis of claim 1, wherein:
the fastener comprises a guiding mechanism and a latching mechanism;
the fastening element comprises a spring mechanism;
the spring mechanism is guided in the guiding mechanism during a movement of the fastening element;
the spring mechanism is latchable in the latching mechanism; and
the fastening element releases the latching element in a latched state of the spring mechanism.

14. The seating furniture chassis of claim 13, wherein the spring mechanism is elastically deformable and removable from the latching mechanism via elastic deformation.

15. The seating furniture chassis of claim 1, wherein the fastening element has a first protrusion that is engageable with a second protrusion of a pivotable holding element, wherein the second protrusion holds the first protrusion due to gravity when the first protrusion is engaged with the second protrusion, such that the fastening element remains in a position in which it releases the latching element.

16. A modular system comprising:
the seating furniture chassis of claim 1; and
a plurality of back parts having different sizes, wherein all of the back parts are fastenable to the fastener in the same manner.

17. A method for fastening the back part of the seating furniture chassis of claim 3 to the fastener of the seating furniture chassis, the method comprising:
inserting the positioning element into the positioning area;
performing the pivoting movement of the back part, wherein the latching element pivots the fastening element about a fastening element pivoting axis during the pivoting movement of the back part, and wherein the latching element is inserted into the latching area due to the pivoting movement of the back part; and
exerting the latching force on the latching element by the fastening element.

18. The seating furniture chassis of claim 1, wherein:
the back part further comprises a latching element and the fastener further comprises a latching area; and
the pivoting movement of the back part about the back part pivot axis moves the latching element into the latching area, and the fastening element latches the latching element in the latching area.

\* \* \* \* \*